UNITED STATES PATENT OFFICE.

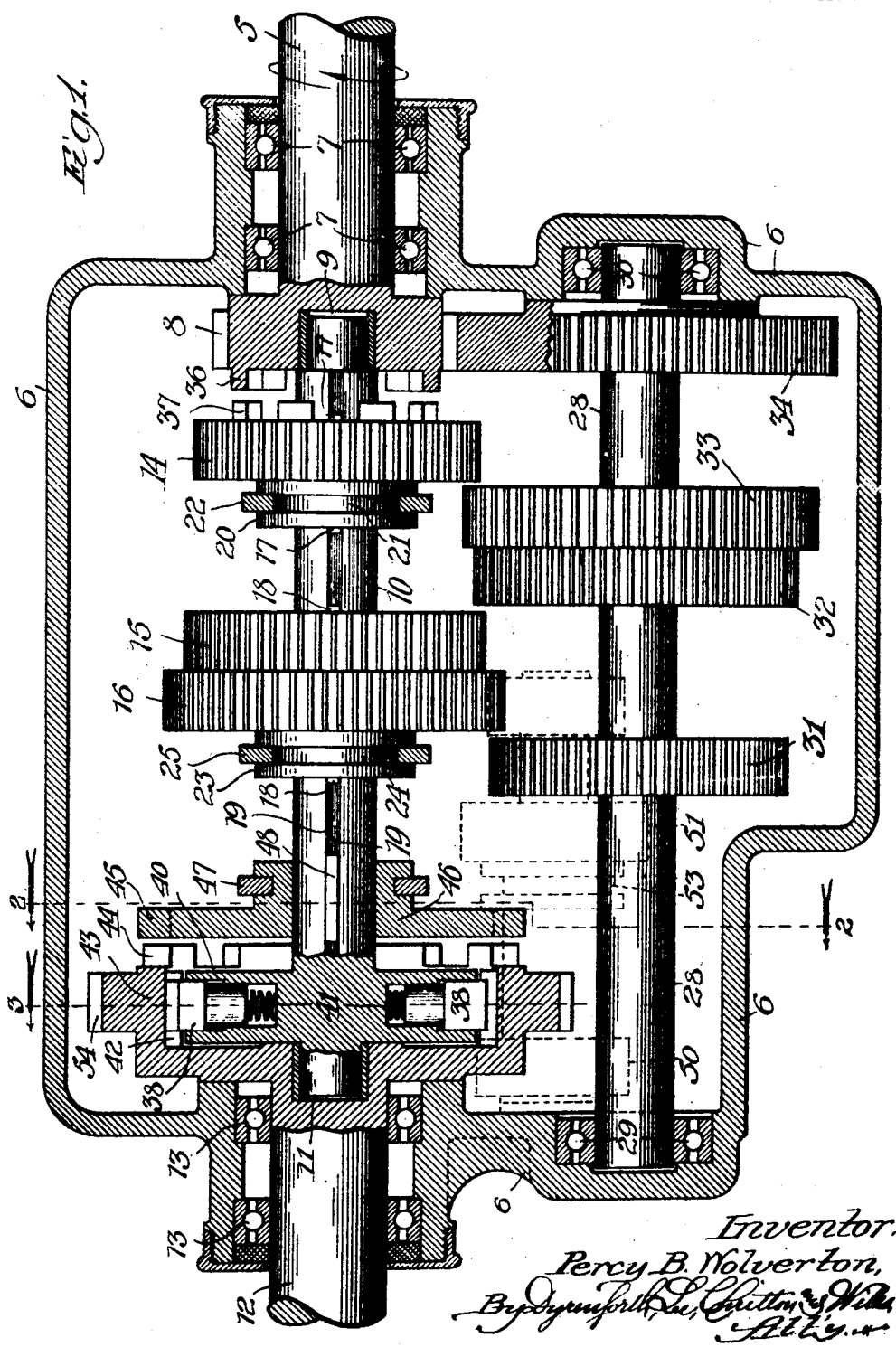

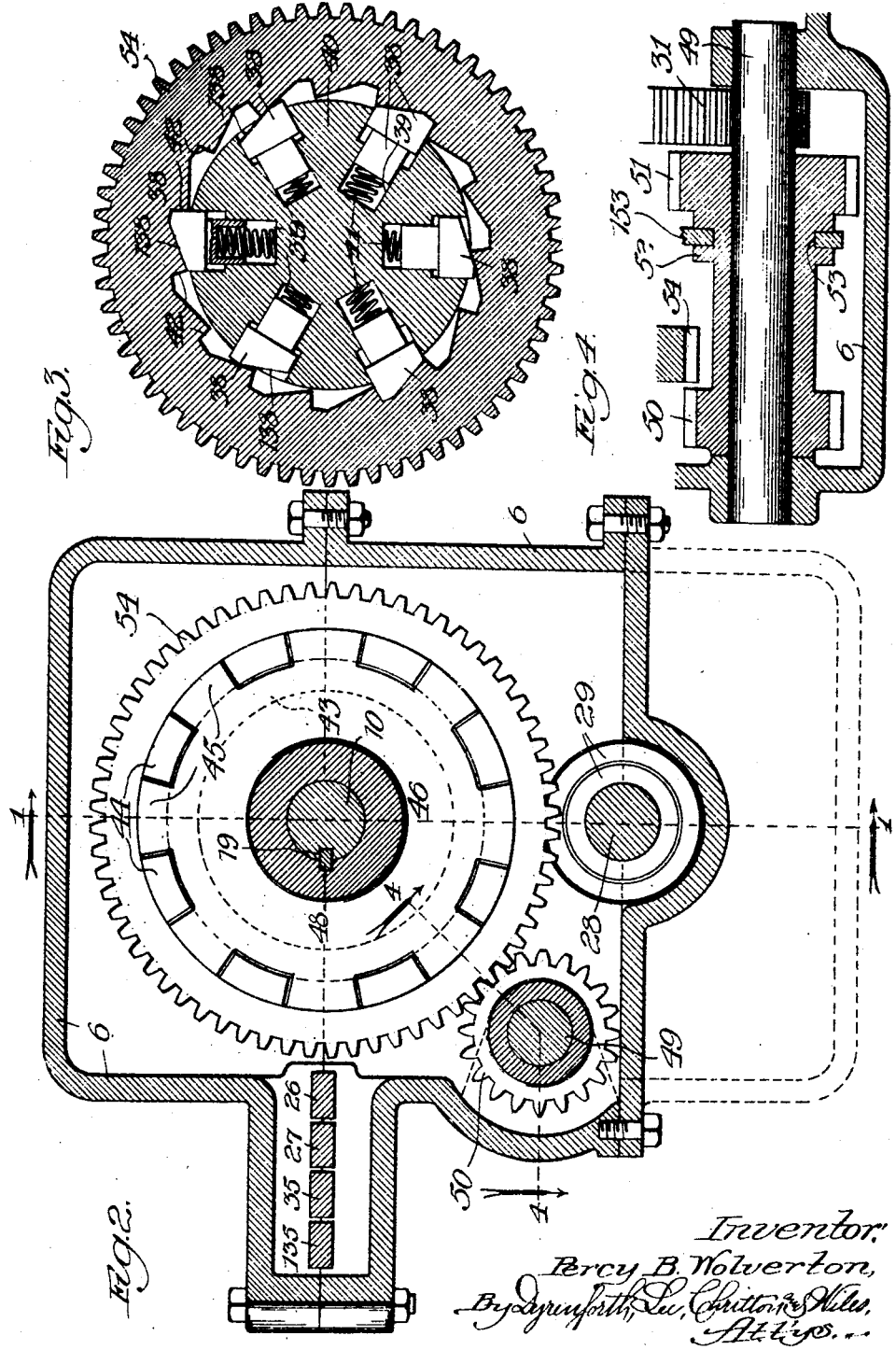

PERCY B. WOLVERTON, OF CHICAGO, ILLINOIS.

TRANSMISSION MECHANISM.

1,412,498.  Specification of Letters Patent.  Patented Apr. 11, 1922.

Application filed March 5, 1920. Serial No. 363,600.

*To all whom it may concern:*

Be it known that I, PERCY B. WOLVERTON, a citizen of the United States, residing at 5605 Broadway, Chicago, in the county of Cook and State of Illinois, have invented a new and useful Improvement in Transmission Mechanism, of which the following is a specification.

My invention relates, more particularly, to transmission mechanism for automobiles, and customarily involving means for driving the driven shaft from the engine shaft at any one of a number of speeds forward and reversely under the control of the operator.

My primary object, generally stated, is to provide a novel, simple and economical construction of transmission mechanism whereby the driven shaft may rotate freely, under its momentum, in the forward movement of the car at a greater rate of speed than the member through the medium of which it is driven from the drive shaft, without disengaging the clutch. Another object is to permit of such rotation of the driven shaft relative to the member through which it is driven, when the speed of said member becomes reduced below that of the driven shaft, regardless of the particular forward speed at which the transmission is set; and another object is to provide for, or prevent, such movement, or over-run, of the driven shaft relative to the driving member under the control of the operator.

In explanation of the foregoing objects, it may be stated that in the ordinary form of transmission, whenever the fuel supplied to the engine is comparatively suddenly reduced while the clutch of the transmission is in, or after the car is speeded up and the engine is slowed down with the clutch thrown out and the clutch again thrown in before the speed of the driven shaft has become reduced to that at which it would be driven by the engine shaft with the transmission in such set position, the engine operates as a drag on the car, oftentimes producing objectionable abrupt braking of the car down to the engine speed, and the above-referred-to objects pertain to the elimination, preferably under the control of the operator, of such braking action, whereby under the conditions above referred to the car, instead of being braked by the engine, will coast until the speed of the drive shaft is sufficient under the particular setting of the gear-transmission, to drive the driven shaft at the speed at which it coasts, thereby producing smooth running qualities.

Referring to the accompanying drawings:

Figure 1 is a view in vertical elevation of a gear transmission of an automobile embodying my invention. Figures 2 and 3 are sections taken at the lines 2 and 3, respectively, on Fig. 1 and viewed in the direction of the arrows; and Figure 4, a section taken at the irregular line 4—4 on Fig. 2 and viewed in the direction of the arrows.

In the particular arrangement shown 5 represents the shaft of an engine of an automobile, which I have chosen to designate the drive shaft, this shaft extending into one end of a gear casing 6 in which it is journalled as through the medium of the ball bearing 7, the inner end of this shaft being provided with a gear 8. The inner end of this shaft contains a socket 9 in which a shaft represented at 10 and which I have designated an intermediate shaft, is journalled at one end, the opposite end of this shaft, which is located within the casing 6, being journalled in the socketed portion 11 of the inner end of a shaft 12 which I have chosen to designate as a driven shaft and which extends into the casing 6 wherein it has journal bearing at the balls 13. The shaft 12 is shown as the propeller shaft of an automobile through the medium of which the rear wheels of the automobile are driven. In the particular arrangement shown the shaft 10 is provided with three gears 14, 15 and 16 which are movable along the shaft 10, but are held against rotation independently of said shaft, by means of keys 17 and 18 carried by these gears and extending into a key-way 19 in the shaft 10. The gear 14 has connected therewith a collar portion 20 which surrounds the shaft 10 and is peripherally grooved as indicated at 21 to receive the yoke end 22 of a gear-shifting bar such as usually provided. The gears 15 and 16 are connected together, the gear 16 being provided with a collar 23 surrounding the shaft 10 and peripherally grooved as indicated at 24 to receive the yoke-shaped end 25 of a similar gear-shifting bar, these bars 22 and 25 being operatively connected with gear-shifting members 26 and 27 longitudinally slidable in the casing 6 and separately operated in a manner well known in the art. The casing 6 also contains a shaft 28, known as a jack shaft, which is journalled therein at ball-bearings 29 and 30, this shaft having rigidly secured thereon gears 31, 32, 33 and 34. The gear 34 is constantly in mesh with the gear 8; the gear 31 is adapted to become meshed with the gear 16, upon sliding the latter to the left in Fig. 1 on the shaft 10 by actuating the bar 27, thereby constituting first-drive speed; the gear 32 is adapted to become meshed with the gear 15 upon shifting the latter gear through the medium of the bar 27, to the right in Fig. 1 on the shaft 10, this thereby constituting second drive speed; and the gear 33 is adapted to intermesh with the gear 14 upon shifting the latter by means of the bar 26 to the left in Fig. 1 on the shaft 10, thereby constituting third drive speed, it being understood that in accordance with the usual practice, the bars 26 and 27, as also shifting bars 35 and 135 provided for a purpose hereinafter described, are adapted to be operated, but one only at a time by the operator.

The high speed, or direct, drive is effected in the particular arrangement shown by clutching the shaft 10 directly to the shaft 5, and this may be effected as through the medium of the clutch teeth 36 and 37 on the opposed faces of the gears 8 and 14, these teeth being moved into clutching engagement with each other by shifting the gear 14 to the right in Fig. 1 on the shaft 10, by means of the bar 26.

In accordance with the preferred embodiment of the invention the shaft 12 is driven from the shaft 10, either by over-run mechanism, or by direct drive connection, under the control of the operator, the latter being provided where it is desired that the coaster or over-run feature be thrown out of commission. The over-run or coaster connection referred to between these shafts comprises a series of dogs 38 located, and longitudinally movable, in radially disposed sockets 39 in a flange 40 on the shaft 10, these dogs being backed up by coil springs 41 interposed between them and the inner walls of the sockets 39 and operating to force the pawls beyond the periphery of the flange 40 and into engagement with the ratchet teeth 42 provided in a circular series about the inner periphery of a cup-shaped annular flange 43 rigid on the shaft 10, the dogs 38 being so constructed, viz., with the receding faces 138 as shown, as to permit the shaft 12 to rotate freely in clockwise direction in Fig. 2 at a faster speed than the shaft 10 or, in other words, over-run the latter shaft, the pawls 38, however, operating to clutch the shaft 10 to the shaft 12 for effecting a positive driving connection between these shafts for driving the shaft 12 in clockwise direction in Fig. 2 at the speed of the shaft 10. The means referred to for engaging the shafts 10 and 12 directly without the over-run feature, comprises clutching means between the shafts shown as formed of a series of teeth 44 extending laterally from the portion 43 and adapted to intermesh with a series of peripherally disposed teeth 45 provided on a disk 46 surrounding the shaft 10, the disk 46 being movable lengthwise of the shaft 10 as through the medium of a gear-shifting bar represented at 47 and of any desirable construction, and held against rotation on the shaft 10 by means of a key 48 carried by the disk 46 and sliding in the key-way 19, the bar 47 being operated by the shifting bar 35.

Provision is also made in the construction shown, for the reverse rotation of the shaft 12, the means for this purpose being as follows: Fixed in the casing 6, to extend parallel with the shaft 10, is a shaft 49 on which is rotatably mounted, and adapted to slide along this shaft, gears 50 and 51 shown as integral and provided with a hub section 52 peripherally grooved as indicated at 53 for receiving a shifting bar 153 operated by the shifting bar 135, by means of which the gears 50 and 51 may be shifted lengthwise of the shaft 49 into intermeshing engagement with a gear 54 provided on the periphery of the flange portion 43, and the gear 31 on the shaft 28 respectively.

The operation of the mechanism is as follows:

Assuming that it is desired that the shaft 12 be driven from the shaft 5 at first speed, the operator shifts the gear 16 to the left in Fig. 1 into mesh with the gear 31, whereupon the drive is from the shaft 5 through gear 8, gear 34, shaft 28, gear 31, gear 16, shaft 10, driving pawls 38 and ratchet teeth 42. For second speed the operator shifts the gear 16 out of mesh with the gear 31 and the gear 15 into mesh with the gear 32 whereupon the drive of the shaft 10 is through the gears 15 and 32 instead of the gears 16 and 31. For third speed, the gears 15 and 16 are out of mesh with the gears 31 and 32 and the operator shifts the gear 14 to the left in Fig. 1 into mesh with the gear 33, the drive of the shaft 10 then being through the gears 14 and 33. For high speed, which in the construction shown consists in driving the shaft 12 at the same speed as the shaft 5, the operator shifts the gear 14 to the right in Fig. 1 out of mesh with the gear 33 and into a position in which its clutch teeth 37 interlock with the teeth 36, thereby directly connecting together the shafts 5 and 10. Upon the assumption that the clutch formed of the disk 46 and teeth 45 is in the position shown in Fig. 1, wherein it is out of engagement with the clutch on the gear 54, the drive of the shaft 12 at any one of the speeds mentioned is through the medium of the pawls 38 which operate to drive the shaft 12 in one direction only, permitting the shaft 12 to over-run the shaft 10 whenever the speed of the shaft 12 exceeds that of the shaft 10, as for example where the engine is speeded up to speed up the car and the supply of fuel to the engine quickly reduced, thereby permitting the car to have a coasting action under the momentum it has acquired.

Inasmuch as it may sometimes be desirable to lock the shafts 10 and 12 together in such a way that the latter shall not be capable of over-running the shaft 10, I provide the clutch mechanism consisting of the tooth-equipped disk 46 and the clutch teeth 44 on the member 43, this clutch being adapted to be positioned, for directly connecting these two shafts together, by shifting the disk 46 to the left in Fig. 1, the drive of the shaft 12 from the shaft 10 being then through this interlocking connection instead of through the pawl mechanism.

In the particular illustrated embodiment of my invention, the drive, as will be noted from the foregoing, of the shaft 12 for driving this shaft in a rearward direction, is from the shaft 5 through the shaft 28, shaft 49 and thence directly through the gears 50 and 54 and the shaft 12, the drive therefore not being through the shaft 10 and not involving the over-run feature, which is of no value in the driving of an automobile backwardly.

While I have illustrated and described a particular construction involving my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is:

1. In transmission mechanism, the combination of a drive shaft, a driven shaft, means for driving said driven shaft from said drive shaft at the same speed as, or at a different speed than, said drive shaft, said means including a device through the medium of which said driven shaft is operated in one direction and permitting over-run of said driven shaft in the same direction under the momentum of the latter when being driven either at the same speed as, or at a different speed than, said drive shaft, a third shaft disposed out of line with said drive and driven shafts and through the medium of which said device is driven to drive said driven shaft at a different speed than that of said drive shaft, and mechanism through the medium of which said driven shaft is driven from said drive shaft at the same speed as that of the latter and independently of said third shaft, and means beyond said device for driving said driven shaft from said drive shaft in a reverse direction, whereby reverse rotation of said driven shaft is not through said device.

2. In transmission mechanism, the combination of a drive shaft, a driven shaft, means for driving said driven shaft from said drive shaft at the same speed as, or at a different speed than, said drive shaft, said means including a device through the medium of which said driven shaft is operated in one direction and permitting over-run of said driven shaft in the same direction under the momentum of the latter when being driven either at the same speed as, or at a different speed than, said drive shaft, a third shaft disposed out of line with said drive and driven shafts and through the medium of which said device is driven to drive said driven shaft at a different speed than that of said drive shaft, and mechanism through the medium of which said driven shaft is driven from said drive shaft at the same speed as that of the latter and independently of said third shaft, and means for driving said driven shaft from said drive shaft in a reverse direction, said last-named means providing an interlocking connection between said drive and driven shafts preventing rotation of either relative to the other in either direction.

3. In transmission mechanism, the combination of a drive shaft, a driven shaft, an intermediate shaft, means for driving said intermediate shaft from said drive shaft at different speeds relative to the latter, means actuated by said intermediate shaft operating to drive said driven shaft in one direction and permit over-run of said driven shaft in the same direction under the momentum of the latter, and means beyond said device for driving said driven shaft from said drive shaft in a reverse direction, whereby reverse rotation of said driven shaft is not through said device.

4. In transmission mechanism, the combination of a drive shaft, a driven shaft, an intermediate shaft, means for driving said intermediate shaft from said drive shaft at different speeds relative to the latter, means actuated by said intermediate shaft operating to drive said driven shaft in one direction and permit over-run of said driven shaft in the same direction under the momentum of the latter, and means, operating independently of said second-named means, for driving said driven shaft from said drive shaft in a reverse direction.

5. In transmission mechanism, the combination of a drive shaft, a driven shaft, an intermediate shaft, a fourth shaft, means for driving said fourth shaft from said drive shaft, means actuated by said fourth shaft for driving said intermediate shaft at different speeds relative to said fourth shaft, means actuated by said intermediate shaft operating to drive said driven shaft in one direction and permit over-run of said driven shaft in the same direction under the momentum of the latter, and means beyond said third means for driving said driven shaft from said drive shaft in a reverse direction.

6. In transmission mechanism, the combination of a drive shaft, a driven shaft, an intermediate shaft, a fourth shaft, means for driving said fourth shaft from said drive shaft, means actuated by said fourth shaft for driving said intermediate shaft at different speeds relative to said fourth shaft, means actuated by said intermediate shaft operating to drive said driven shaft in one direction and permit over-run of said driven shaft in the same direction under the momentum of the latter, and means driven from said fourth shaft and located beyond said third-named means for driving said driven shaft in a reverse direction, whereby reverse rotation of said driven shaft is not through said device.

7. In transmission mechanism, the combination of a drive shaft, a driven shaft, an intermediate shaft, a fourth shaft, means for driving said fourth shaft from said drive shaft, means actuated by said fourth shaft for driving said intermediate shaft at different speeds relative to said fourth shaft, means actuated by said intermediate shaft operating to drive said driven shaft in one direction and permit over-run of said driven shaft in the same direction under the momentum of the latter, and means actuated by said fourth shaft and operating, independently of said third-named means, to drive said driven shaft in a reverse direction.

8. In transmission mechanism, the combination of a drive shaft, a driven shaft, an intermediate shaft carrying gears of different sizes, a fourth shaft provided with gears for intermeshing with the gears on said intermediate shaft, the gears on said intermediate shaft and said fourth shaft being relatively movable lengthwise thereof to permit selective intermeshing of the gears for driving said intermediate shaft at different speeds relative to said fourth shaft, means for driving said fourth shaft from said drive-shaft, means actuated by said intermediate shaft operating to drive said driven shaft in one direction and permit over-run of said driven shaft in the same direction under the momentum of the latter, and means actuated by said fourth shaft and operating independently of said first-named means, for driving said driven shaft in a reverse direction.

9. In transmission mechanism, the combination of a drive shaft, a driven shaft, an intermediate shaft located between said drive and driven shafts and in alignment therewith, said intermediate shaft carrying gears of different sizes, a fourth shaft provided with gears for intermeshing with the gears on said intermediate shaft, the gears on said intermediate shaft and said fourth shaft being relatively movable lengthwise thereof to permit selective intermeshing of the gears for driving said intermediate shaft at different speeds relative to said fourth shaft, means for actuating said fourth shaft from said drive shaft, means actuated by said intermediate shaft operating to drive said driven shaft in one direction and permit over-run of said driven shaft in the same direction under the momentum of the latter, a gear on said driven shaft, another gear on said fourth shaft, and gear mechanism interposed between said last-referred-to gear on said fourth shaft and the gear on said driven shaft for driving said driven shaft in a reverse direction.

10. In transmission mechanism, the combination of a drive shaft, a driven shaft, an intermediate shaft, means for driving said intermediate shaft from said drive shaft at different speeds relative to the latter, means actuated by said intermediate shaft operating to drive said driven shaft and permitting, or preventing, under the control of the operator, over-run of said driven shaft under the momentum of the latter, and means, operating independently of said second-named means for driving said driven shaft in a reverse direction.

11. In transmission mechanism, the combination of a drive shaft, a driven shaft, an intermediate shaft located between said drive and driven shafts and in alignment therewith, means for driving said intermediate shaft from said drive shaft, means actuated by said intermediate shaft operating to drive said driven shaft in one direction and permit over-run of said driven shaft in the same direction under the momentum of the latter, and means, operating independently of said second named means for driving said driven shaft from said drive shaft in a reverse direction.

12. In transmission mechanism, the combination of a drive shaft, a driven shaft, an intermediate shaft, a fourth shaft, means for driving said fourth shaft from said drive shaft, means actuated by said fourth shaft for driving said intermediate shaft at a different speed than said fourth shaft, means actuated by said intermediate shaft operating to drive said driven shaft in one direction and permit over-run of said driven shaft in the same direction under the momentum of the latter, and means, operating independently of said third-named means for driving said driven shaft from said drive shaft in a reverse direction.

13. In transmission mechanism, the combination of a drive shaft, a driven shaft, an intermediate shaft, a fourth shaft driven from said drive shaft, means for driving said intermediate shaft directly from said drive shaft, means for driving said intermediate shaft from said fourth shaft at a different speed than said drive shaft, means actuated by said intermediate shaft operating to drive said driven shaft in one direction and permit over-run of said driven shaft in the same direction under the momentum of the latter, and means, operating independently of said third-named means for driving said driven shaft in a reverse direction from said drive shaft.

14. In transmission mechanism, the combination of a drive shaft, a driven shaft, means operating to drive said driven shaft in a given direction from said drive shaft and to permit, or prevent, under the control of the operator, over-run of said driven shaft under the momentum of the latter, in said direction, and means, operating independently of said first-named means, for driving said driven shaft in a reverse direction.

15. In transmission mechanism, the combination of a drive shaft, a driven shaft, means for driving said driven shaft from said drive shaft at the same speed as, or at a different speed than, said drive shaft, said means including a device through the medium of which said driven shaft is operated in one direction and permitting over-run of said driven shaft in the same direction under the momentum of the latter when being driven either at the same speed as, or at a different speed than, said drive shaft, a third shaft disposed out of line with said drive and driven shafts and through the medium of which said device is driven to drive said driven shaft at a different speed than that of said drive shaft, and mechanism through the medium of which said driven shaft is driven from said drive shaft at the same speed as that of the latter and independently of said third shaft, and means beyond said device for driving said driven shaft from said drive shaft in a reverse direction, said last-named means providing an interlocking connection between said drive and driven shafts preventing rotation of either relative to the other in either direction.

16. In transmission mechanism, the combination of a drive shaft, a driven shaft, an intermediate shaft located between said drive and driven shafts and in alignment therewith, said intermediate shaft carrying gears of different sizes, a fourth shaft provided with gears for meshing with the gears on said intermediate shaft, the gears on said fourth shaft being movable lengthwise of the gears on said intermediate shaft to permit selective intermeshing of the gears for driving said intermediate shaft at different speeds relative to said fourth shaft, means for actuating said fourth shaft from said drive shaft, means actuated by said intermediate shaft operating to drive said driven shaft in one direction and permit over-run of said driven shaft in the same direction under the momentum of the latter, a gear on said driven shaft located beyond said last-named means, another gear on said fourth shaft and gear mechanism interposed between said last-referred-to gear on said fourth shaft and the gear on said driven shaft for driving said driven shaft in a reverse direction.

17. In transmission mechanism, the combination of a drive shaft, a driven shaft, an intermediate shaft located between said drive and driven shafts and in alignment therewith, said intermediate shaft carrying gears of different sizes, a fourth shaft provided with gears for meshing with the gears on said intermediate shaft, the gears on said fourth shaft being movable lengthwise of the gears on said intermediate shaft to permit selective intermeshing of the gears for driving said intermediate shaft at different speeds relative to said fourth shaft, means for actuating said fourth shaft from said drive shaft, means actuated by said intermediate shaft operating to drive said driven shaft in one direction and permit over-run of said driven shaft in the same direction under the momentum of the latter, a gear on said driven shaft located beyond said last-named means, another gear on said fourth shaft, gear mechanism interposed between said last-referred-to gear on said fourth shaft and the gear on said driven shaft for driving said driven shaft in a reverse direction, and means movable into and out of a position in which said driven shaft is prevented from over-running in the driving thereof through said intermediate shaft.

18. In transmission mechanism, the combination of a drive shaft, a driven shaft, means for driving said driven shaft from said drive shaft at different speeds relative to the latter in one direction and permitting over-run of said driven shaft in the same direction under the momentum of the latter, and means for driving said driven shaft from said drive shaft in a reverse direction and engaging said driven shaft beyond said first-named means whereby the drive of said driven shaft in a reverse direction is not through said first-named means.

PERCY B. WOLVERTON.